UNITED STATES PATENT OFFICE 2,528,174

PROCAINE SALTS OF BIOSYNTHETIC PENICILLINS

Harley W. Rhodehamel, Jr., Indianapolis, Ind., assignor to Eli Lilly and Company, Indianapolis, Ind., a corporation of Indiana No Drawing. Application July 1, 1948,
Serial No. 36,455

4 Claims. (Cl. 260—302)

My invention relates to salts of biosynthetic penicillins and more particularly to insoluble salts of thenyl penicillins.

An object of my invention is to prepare insoluble salts of thenyl penicillins. Another object is to provide insoluble salts useful in the isolation and purification of biosynthetic penicillins. Another object is to provide insoluble salts of thenyl penicillins which have a prolonged therapeutic effect. Other objects will be apparent from the following disclosure of my invention.

I have discovered that thenyl penicillins form crystalline salts with procaine and that such salts possess properties whereby the above and other objects are accomplished.

The novel salts of my invention may be represented by the following formula

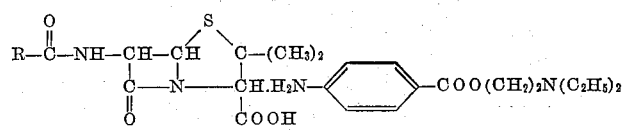

wherein R represents a member of the group consisting of the thenyl radical, lower alkyl-substituted thenyl radicals, and halogen-substituted thenyl radicals.

Illustrative examples of compounds within the scope of my invention are the procaine salts of 2-thenyl penicillin, 4-chloro-3-thenyl penicillin, 4-ethyl-2-thenyl penicillin, 4-bromo-2-thenyl penicillin and 4-propyl-3-thenyl penicillin.

The thenyl penicillins used in producing the salts of my invention may be obtained by growing a penicillin-producing mold in a culture medium containing a suitable precursor compound which the mold may metabolize and incorporate in the biosynthetic penicillin. Procedures for the preparation of the biosynthetic penicillins are described in detail in the publication by Behrens et al., J. Biol. Chem., 175, 793 (1948).

The above-mentioned procaine salts of thenyl penicillins may be prepared by chemical reactions of addition or metathesis. The acidic form of the biosynthetic penicillin may be reacted with procaine base, or a soluble metallic or metalline (e. g. ammonia) salt of the biosynthetic penicillin may be reacted with a soluble acid addition salt of procaine. Thus, for example, the acidic form of the biosynthetic penicillin and procaine base are mixed together in amyl acetate to yield as a precipitate, the desired procaine salt of the biosynthetic penicillin. Alternatively, the sodium salt of the biosynthetic penicillin and procaine hydrochloride are reacted in aqueous solution to yield the insoluble procaine salt. The insoluble salt which precipitates is isolated, as by filtration, and freed from traces of solvent in any suitable manner, such as subjecting the salt to a vacuum.

It is desirable to employ an amount of procaine salt or procaine base in slight stoichiometric excess to assure the complete reaction of all of the biosynthetic penicillin present. The procaine salts of this invention being substantially insoluble in water and the common organic solvents, precipitate when prepared in one of these solvents, leaving the excess procaine or soluble salt thereof in solution. It is believed that the procaine salt of the biosynthetic penicillin comprises the combination of the acidic carboxyl group of the penicillin with the basic nitrogen of the diethylaminoethyl group in the procaine molecule.

The biosynthetic penicillin may be recovered from its combination with procaine by dissolving or suspending the procaine salt in aqueous solution, acidifying the solution to about pH 2, and extracting the biosynthetic penicillin with a penicillin solvent such as amyl acetate, chloroform and the like. From the solution thus obtained the biosynthetic penicillin may be recovered by any of the several suitable known processes.

The following examples described specific preparations of several salts of my invention.

Example 1

The procaine salt of 2-thenyl penicillin represented by the formula

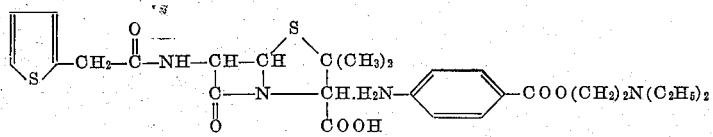

is obtained as follows:

2-thenyl penicillin used in preparing the above salt may be produced by growing a penicillin-producing mold in a culture medium containing about 0.02 percent of N-(2-hydroxyethyl)-2- thienylacetamide, and the biosynthetic penicillin produced in the broth may be isolated as the sodium salt.

To about 5.2 parts of the sodium salt of the 2-thenyl penicillin dissolved in about 30 parts of water is added a solution of about 5 parts (20 percent excess) of procaine hydrochloride in 15 parts of water. An immediate crystalline precipitate of the procaine salt of 2-thenyl penicillin separates. The mixture is cooled to about 0° C. for about 2 hours and is then filtered to separate the insoluble procaine salt of 2-thenyl penicillin. The separated salt is washed with a small amount of cold water and is then dried in vacuo.

*Example 2*

The procaine salt of 3-thenyl penicillin represented by the following formula

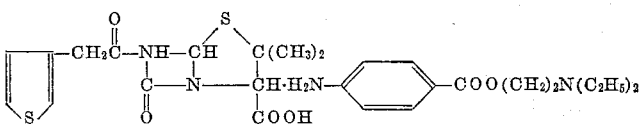

may be prepared as follows:

3-thenyl penicillin is obtained by growing a penicillin-producing mold in a culture medium containing about 0.02 percent of N-(2-hydroxyethyl-3-thienylacetamide, and is isolated as its sodium salt. The procaine salt of 3-thenyl penicillin is obtained from equal proportions of the sodium salt of 3-thenyl penicillin and procaine hydrochloride by the procedure described in Example 1.

*Example 3*

Instead of using a soluble salt of the penicillin and a procaine salt as described in Examples 1 and 2, the reaction of the acid form of the biosynthetic penicillin and the procaine base may be used. The biosynthetic penicillin in acid form is obtained by extraction of the acidified broth. Thus, the procaine salt of 2-thienyl penicillin represented by the following formula

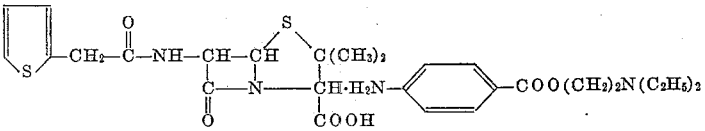

may also be prepared as follows: 2-thenyl penicillin is obtained by growing a penicilling-producing mold in a culture medium containing about 0.02 percent of N-(2-hydroxyethyl)-2-thienyl-acetamide, and extracting the culture medium or broth with amyl acetate. The amyl acetate is clarified with about 0.5 percent of decolorizing carbon or fuller's earth and is concentrated by evaporation in vacuo. To about 4 liters of this amyl acetate solution containing about 3 g. of 2-thenyl penicillin in acidic form are added slowly and with stirring 100 cc. of amyl acetate containing about 2.5 g. of procaine base. The procaine salt of 2-thienyl penicillin precipitates in crystalline form. The solution is cooled to about 0° C. for about 2 hours and is then filtered to isolate the precipitated procaine salt of 2-thenyl penicillin. The isolated crystalline salt is washed with a small amount of cold amyl acetate and dried in vacuo to remove traces of moisture and residual acetate.

The 2-thenyl penicillin is recovered from its insoluble salt as follows: 2 g. of the procaine salt are suspended in about 50 ml. of cold water and sufficient dilute sulfuric acid is added slowly to acidify the solution to about pH 2. The acidified mixture is extracted with about 50 ml. of amyl acetate whereupon the 2-thenyl penicillin dissolves in the amyl acetate, and the procaine in the form of its sulfate salt dissolves in the aqueous phase. The amyl acetate layer is separated from the aqueous layer and the 2-thenyl penicillin is recovered in purified form from the amyl acetate by extraction of the amyl acetate with cold dilute aqueous alkali.

By proceeding through the insoluble procaine penicillin salt, substantial purification of the 2-thenyl penicillin is effected, the degree of purification amounting to 25 percent or more. If a more greatly purified 2-thenyl penicillin is desired, the procaine salt of the penicillin is recrystallized from alcohol or other suitable solvent prior to the recovery of the biosynthetic penicillin therefrom. Recovery of the 2-thenyl penicillin from the purified procaine salt yields the biosynthetic penicillin in substantially pure form.

*Example 4*

The procaine salt of 5-chloro-2-thenyl penicillin which may be represented by the following formula

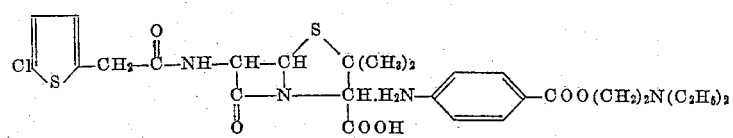

is obtained as follows:

A penicillin-producing mold is grown in a culture medium containing about 0.02 percent of the sodium salt of 5-chloro-2-thienylacetic acid, and the 5-chloro-2-thenyl penicillin produced in the broth is isolated as its potassium salt.

To about one part of the potassium salt of the 5-chloro-2-thenyl penicillin dissolved in about 6 parts of water is added a solution of about one part of procaine hydrochloride in 3 parts of water. The crystalline precipitate of the procaine salt of 5-chloro-2-thenyl penicillin which separates is removed by filtration, washed with a small amount of cold water and dried in vacuo.

*Example 5*

The procaine salt of 4-methyl-3-thenyl penicillin represented by the following formula

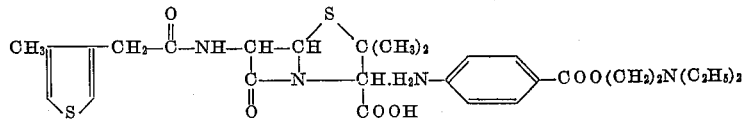

may be prepared from the sodium salt of 4-methyl-3-thenyl penicillin and procaine hydrochloride according to the procedure described in Example 4.

The 4-methyl-3-thenyl penicillin used in the preparation can be obtained by growing a penicillin-producing mold in the presence of about 0.02 percent of N-(2-hydroxyethyl)-4-methyl-3-thienylacetamide.

For therapeutic purposes, the procaine salts of the biosynthetic penicillins of this invention preferably are administered intramuscularly as finely divided suspensions of the salts in liquid vehicles. Suitable vehicles for the provision of injectable suspensions include aqueous and oleaginous vehicles, for example, water, and vegetable oils such as cottonseed oil, sesame oil, and the like. As will be readily understood, the particle size of the salt in suspension should be sufficiently small to permit the particles to pass easily through the lumen of a hypodermic needle without packing within and blocking the needle. Illustratively, a particle size which avoids blocking of a 20-gauge needle is that which will pass through a 200-mesh screen.

By way of illustration, an aqueous medicinal composition which upon intramuscular injection is capable of maintaining a therapeutically effective biosynthetic penicillin blood level for a period of about 24 hours comprises a suspension containing about 300 mg. of finely divided procaine salt of 2-thenyl penicillin per ml. of water.

Since, as is known, penicillins are relatively unstable in the presence of appreciable amounts of moisture, aqueous compositions containing the novel procaine salts of this invention should be used within a comparatively short time after their preparation. For this reason it is often desirable to provide the procaine salts in oleaginous vehicles. A suitable oleaginous composition which will retain therapeutic potency over a long period of time is prepared by suspending in about 5 ml. of sesame oil 2 g. of the procaine salt of 2-thenyl penicillin, ground to a sufficiently small particle size so that all of the material will pass through a 200-mesh screen. Intramuscular injection of 1 ml. of this suspension will maintain a therapeutically effective blood concentration of 2-thenyl penicillin for at least 24 hours.

It is to be understood that the above-mentioned therapeutic compositions are given by way of illustration only and it will be apparent to those skilled in the art that numerous modifications and variations of the above medicinal compositions may be made.

I claim as my invention:

1. The procaine salt of a thenyl penicillin represented by the formula

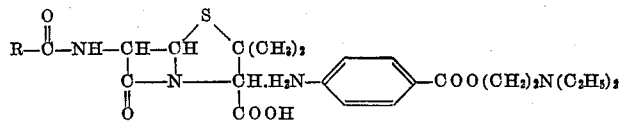

wherein R represents a member of the group consisting of the thenyl radical, lower alkyl-substituted thenyl radicals, and halogen-substituted thenyl radicals.

2. The procaine salt of 2-thenyl penicillin represented by the formula

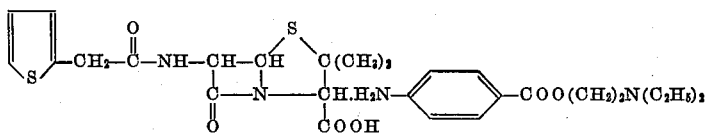

3. The procaine salt of 3-thenyl penicillin represented by the formula

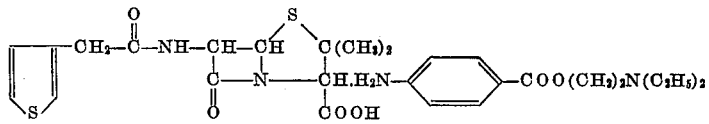

4. The procaine salt of 5-chloro-2-thenyl penicillin represented by the formula

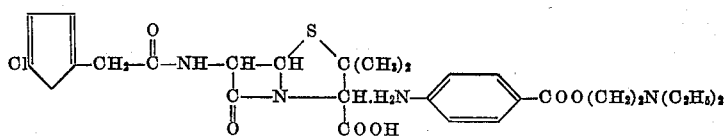

HARLEY W. RHODEHAMEL, JR.

REFERENCES CITED

The following references are of record in the file of this patent:

Drug and Cosmetic Industry, November 1947, page 595.

Certificate of Correction

Patent No. 2,528,174                                          October 31, 1950

HARLEY W. RHODEHAMEL, Jr.

It is hereby certified that error appears in the printed specification of the above numbered patent requiring correction as follows:

Column 1, line 52, for the word "ammonia" read *ammonium*; column 3, lines 44, 54, and 74, and column 4, lines 2, 5, and 10, for "2-thienyl" read *2-thenyl*;

and that the said Letters Patent should be read as corrected above, so that the same may conform to the record of the case in the Patent Office.

Signed and sealed this 26th day of December, A. D. 1950.

[SEAL]

THOMAS F. MURPHY,
    *Assistant Commissioner of Patents.*